Dec. 6, 1949 J. W. DAVIS 2,490,212
MATERIAL UNLOADING CHUTE FOR TRUCKS
Filed March 22, 1946 4 Sheets-Sheet 1
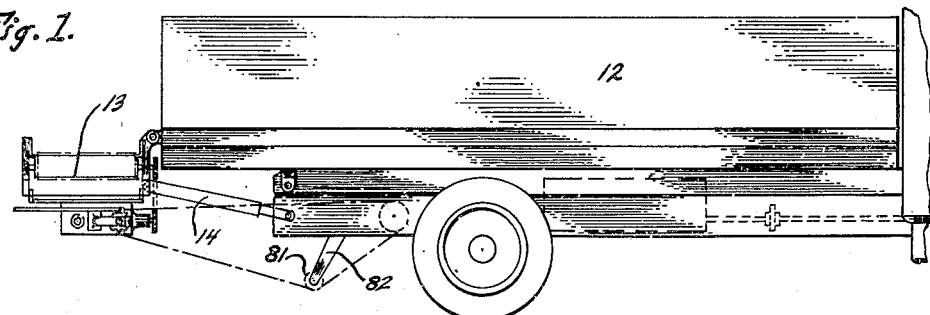
Fig. 1.
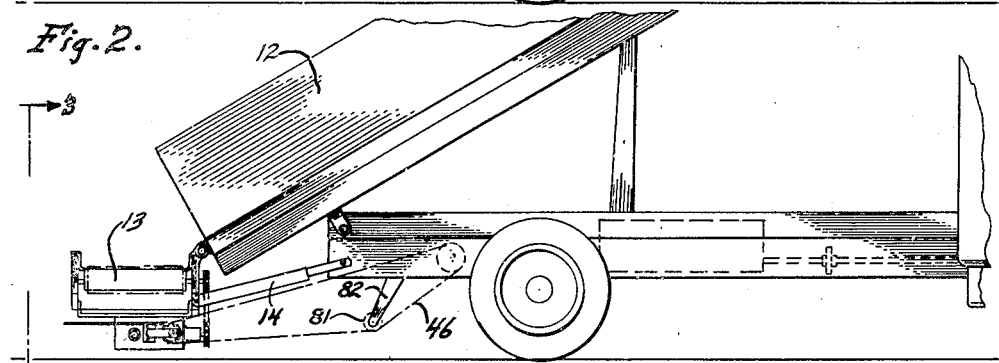
Fig. 2.
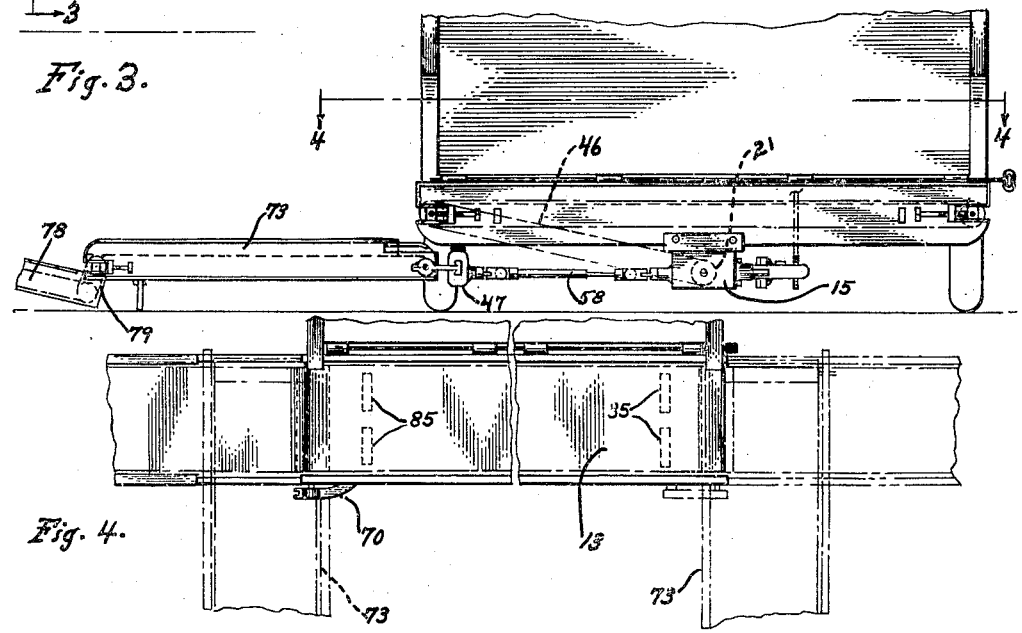
Fig. 3.
Fig. 4.
INVENTOR.
Joseph W. Davis
BY
Charles K. Woodin
Agent Dec. 6, 1949 J. W. DAVIS 2,490,212
MATERIAL UNLOADING CHUTE FOR TRUCKS
Filed March 22, 1946 4 Sheets-Sheet 2

INVENTOR
Joseph W. Davis
BY
Charles H. Wood
agent.

Dec. 6, 1949 J. W. DAVIS 2,490,212
MATERIAL UNLOADING CHUTE FOR TRUCKS
Filed March 22, 1946 4 Sheets-Sheet 3
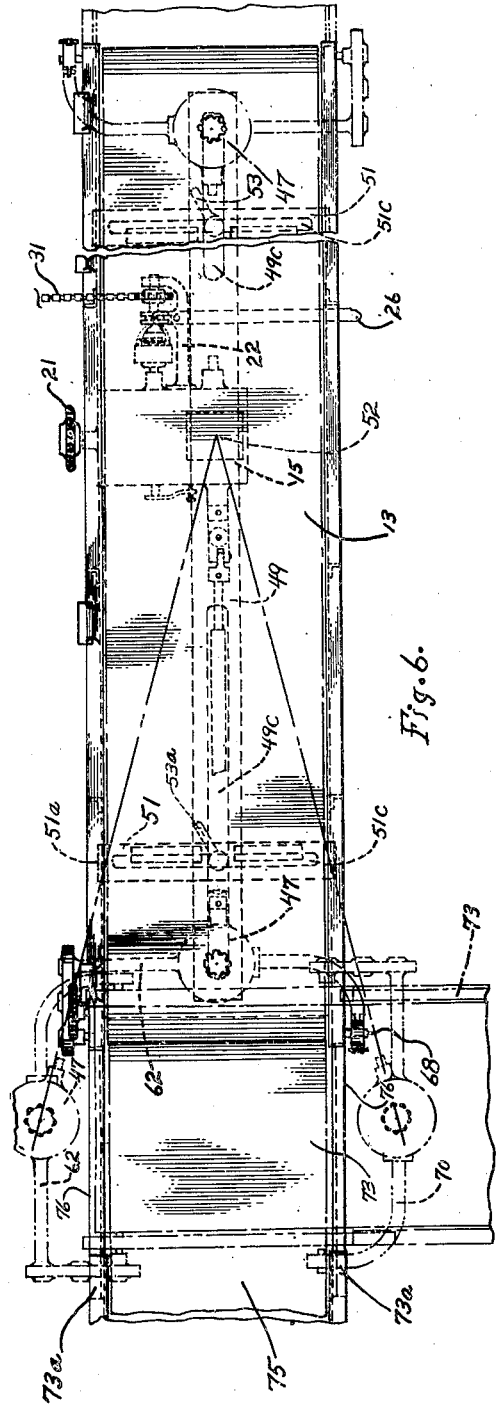
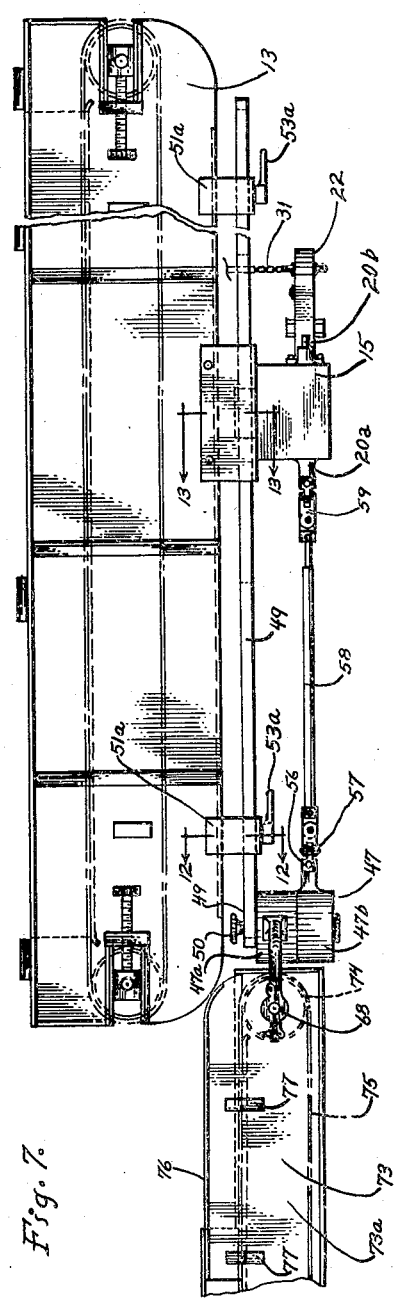
INVENTOR.
Joseph W. Davis
BY Dec. 6, 1949 J. W. DAVIS 2,490,212
MATERIAL UNLOADING CHUTE FOR TRUCKS
Filed March 22, 1946 4 Sheets-Sheet 4
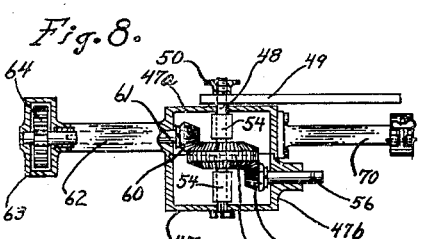
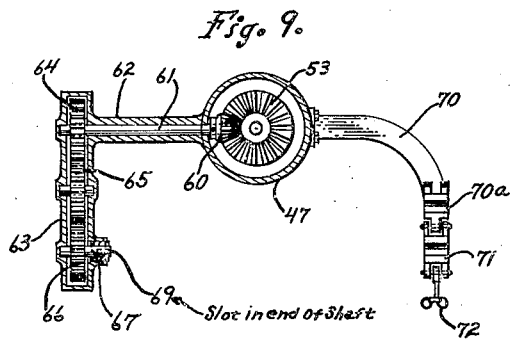
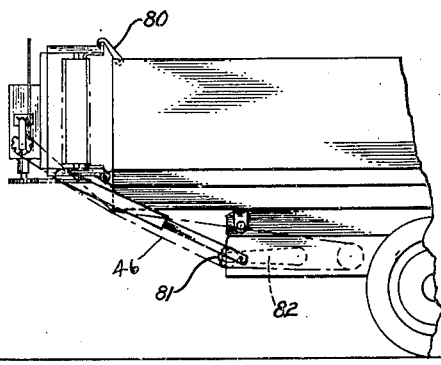
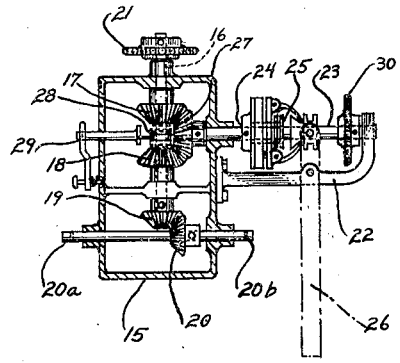
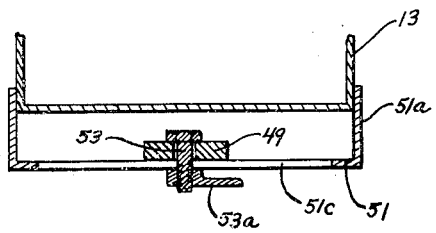
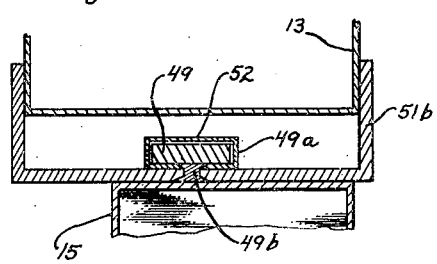
INVENTOR.
Joseph W. Davis
BY
Charles K Woodin
agent Patented Dec. 6, 1949

2,490,212

UNITED STATES PATENT OFFICE 2,490,212

MATERIAL UNLOADING CHUTE FOR TRUCKS

Joseph W. Davis, Bloomington, Ill.

Application March 22, 1946, Serial No. 656,289

6 Claims. (Cl. 214—83.16)

This invention relates to a material unloading chute for trucks and the like and concerns itself primarily with an auxiliary conveying chute adapted for positioning at either end of the main transversely extending conveyor and swingable to various angular relations therewith and driven by the conveyor operating mechanism.

According to this invention, it is possible to remove the unloading chute from one end of the conveyor with a portion of its driving mechanism and attach the same to the other end of the conveyor and coupling the removable driving mechanism with the stationary driving mechanism and through a remote control the unloading mechanism may be set in motion from the rear end of the truck.

Other features of the invention will be described and pointed out as the description proceeds.

The invention comprises the novel structure and combination of parts hereinafter described and more particularly pointed out and defined in the appended claims.

In the accompanying drawings which illustrate a preferred form of this invention and in which similar reference numerals refere to similar features in the different views:

Fig. 1 is a fragmentary side elevation of a truck with a main transverse unloading conveyor to which a chute involving this invention is applied;

Fig. 2 is a view similar to Fig. 1 but showing the truck body in tilted or unloading position;

Fig. 3 is a rear end elevational view taken from the line 3—3 of Fig. 2 looking in the direction of the arrows;

Fig. 4 is a sectional view taken upon the line 4—4 of Fig. 3 loading in the direction of the arrows and on a reduced scale;

Fig. 6 is a top plan view of the main conveyor and the chute or auxiliary conveyor;

Fig. 7 is a side elevational view of the main conveyor and chute;

Fig. 8 is a sectional view of the removable gear box;

Fig. 9 is a top view of Fig. 8;

Fig. 10 is an open view of the stationary gear box and

Fig. 11 is a fragmentary view illustrating the manner in which the main conveyor may be swung up and hooked to the body of the truck;

Fig. 12 is an enlarged section on the line 12—12 of Fig. 7; and

Fig. 13 is an enlarged section on the line 13—13 of Fig. 7.

Figure 5:
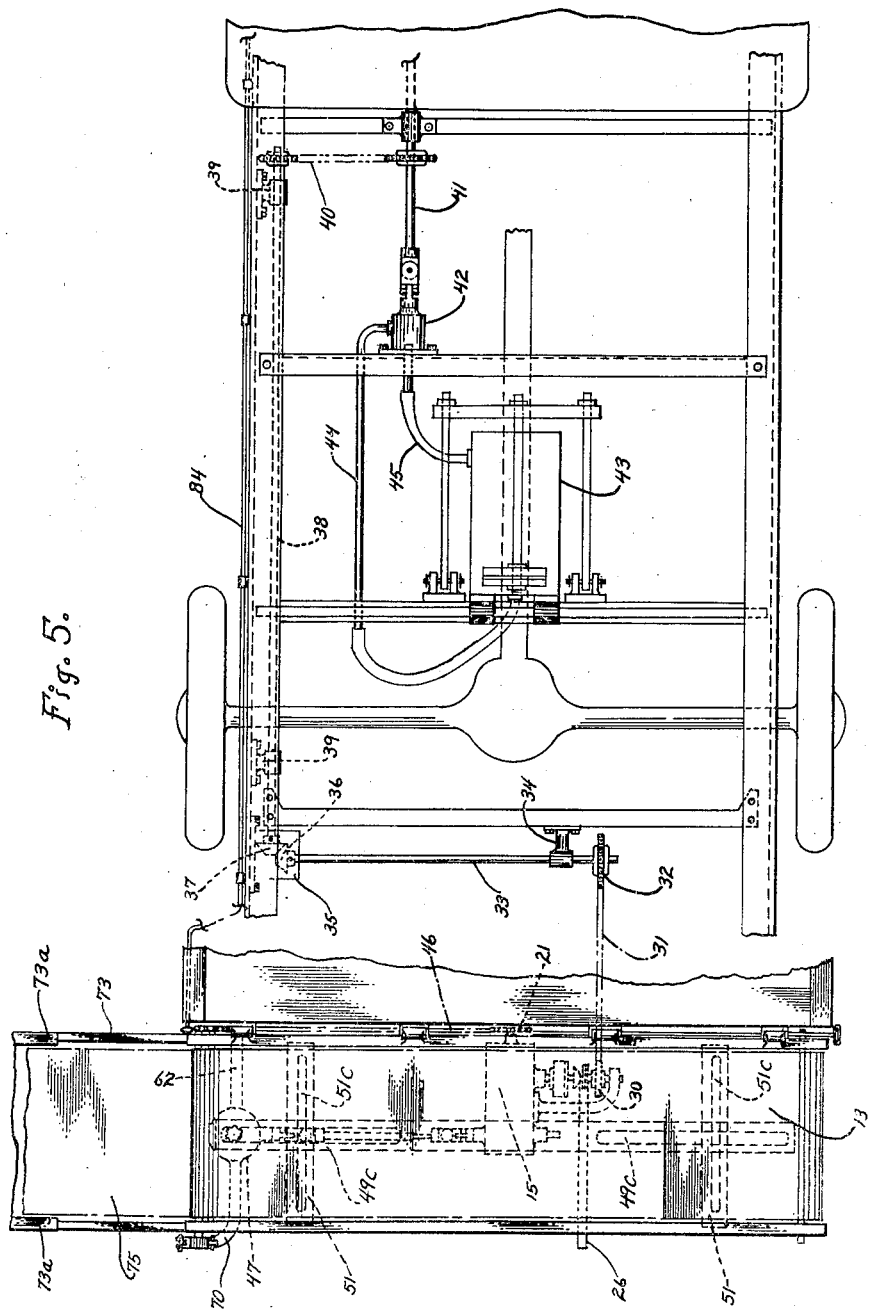
Fig. 5 is a top plan view of a portion of the chassis of the truck with the main conveyor and chute.

In referring now to the drawing, it will be observed that the invention is shown applied to a coal truck having a tiltable body 12 to the rear end of which is hinged a transversely extending conveyor 13 in a manner disclosed in my copending application, Serial No. 599,933, filed June 16, 1945, now Patent No. 2,484,689 granted October 11, 1949, and braced by telescopic adjustable radius rods 14 which pivotally connect the conveyor with the truck frame in such a manner that the conveyor can be swung or folded upwardly and hooked to the body as shown in Fig. 11.

Upon the lower frame members of the conveyor 13 there is secured a stationary gear box 15 the interior of which is shown in Fig. 10. A shaft 16 is journalled in suitable bearings in the gear box and loosely carries a pair of confronting bevelled pinions 17 and 18 and a terminal bevelled pinion 19 which meshes with a pinion 20 on a shaft 20a extending transversely through the housing. Upon the outer end of shaft 16, there is a sprocket wheel 21 to which reference will later be made. The gear box 15 is provided with an L-shaped exterior bracket 22, which forms the outer bearing for a driving shaft 23 adapted to be connected with a driven shaft 24 through a friction clutch 25 operated through a shifting lever 26. The inner end of the driven shaft 24 carries a beveled pinion 27 which is adapted for driving either of the bevelled pinions 17 or 18, either of which may be clutched to the shaft 16 through a clutch 26 slidably splined upon the shaft 16 between the pinions 17 and 18 and actuated by a lever 29. The driving shaft 23 has affixed thereon a sprocket wheel 30. The sprocket wheel 30 is geared by a sprocket chain 31 (Fig. 5) with a sprocket gear 32 secured upon a shaft 33 which is journalled in a bracket 34 secured to the rear end of the truck frame and in a gear box 35 fixed to the rear corner of the frame. A pinion 36 upon the shaft 33 within the gear box 35 meshed with a gear 37 secured upon a shaft 38 journalled in bearings 39 secured to the truck frame adjacent one side thereof.

The shaft 38 is connected by sprocket gearing 40 with a shaft 41 journalled in the truck frame and connected to a hydraulic motor or pump 42 which is supplied by fluid from a fluid tank or cylinder 43 through pipes or hose 44 and 45. It might be mentioned that shaft 41 extends into the transmission of the power plant of the truck.

Operation of the shaft 41 will initiate operation of the hydraulic motor, an operation which will draw the fluid into the hydraulic motor and cause its operation for increasing the power which is used for lifting or tilting the truck body.

The aforementioned sprocket gear 21 on shaft 16 is connected by sprocket gearing 46 with the head sprocket of the main conveyor 13 as shown in Fig. 5.

Rearward of the gear box 15, there is a removable gear box 47 removably mounted upon the lower frame of the main conveyor 13, for a swivel movement. To this end, the gear box 47 has a central vertical shaft 48 (Fig. 8) which is preferably stationary and extends above the gear box where it is slidably secured to a slotted bar 49 by means of a removable nut 50. The bar 49 is supported at the bottom of the conveyor frame by means of transverse slotted bars 51 and an intermediate pivot clamp 52. The transverse supports 51 may be secured in proper location by terminal flanges 51a or in any other manner. The gear box 47 is made of two relatively rotatable sections 47a and 47b so that they can rotate relatively when the chute is swung at right angles as will later appear.

In referring to Fig. 12, it will be noted that the slotted bar 49 which is supported near its ends upon the transverse slotted braces 51 is adapted to be clamped in any position of adjustment by clamping bolts 53 having wing nuts 53a. At the medial pivot point of the bar 49 there is a channel-like support 51b (Fig. 13) secured to the conveyor above the gear box 15. The bar 49 passes over this support 51b and is pivoted thereto by means of a metal strap 49a or the like passing around the bar 49 and having a pivot stud 49b pivoted in the bottom of the channel support 51b.

The slots 51c in the supports 51 extend substantially co-extensive with the conveyor and the bar 49 has slots 49c extending from each side of the pivot clamp 52. As a result, when the wing nuts 53a are loosened, the bar 49 can be swung in azimuth upon pivot 49b and clamped in any adjusted position by tightening the nuts. At the same time, the swivel gear box 47 will allow the chute or secondary conveyor 73 to pivot and swing so that it can be extended to discharge in a lateral direction at right angles to the main conveyor. As the bar 49 can be swung in either direction, clockwise or counter-clockwise, the chute 73 can be adjusted to discharge from either side of the main conveyor. The chute 73 with its bearing box 47 and shaft 58 can be quickly removed from one end of the conveyor and attached at the other end as will later more fully appear.

A double faced beveled gear 53 (Fig. 8) is rotatably mounted upon the shaft 48 within the gear box 47. This gear is preferably confined between a pair of spaced collars 54 on said shaft. The lower face of the gear 53 is in mesh with a bevel pinion 55 on a shaft 56 extending into the housing. The shaft 56 has a flexible coupling connection 57 with a shaft 58 best shown in Fig. 7. The shaft 58 has a flexible coupling connection 59 with the left-hand end of the aforementioned shaft 20a. The flexible coupling 59 is readily removable from the left-hand end of shaft 20a for attachment to the right-hand end 20b of said shaft when it is desired to move the chute from one end of the conveyor to the other end as will later more fully appear.

The upper face of the bevel gear 53 in gear box 47 is in mesh with a bevel pinion 60 which is secured upon a shaft 61 journalled in a bearing arm 62 on the casing. The outer end of said shaft 61 extends into a casing 63 where it carries a spur gear 64 which meshes with an idler gear 65 which in turn drives a spur gear 66 secured to a shaft 67 in the casing. The shaft 67 extends through a bearing formed upon the casing and is fashioned for receiving one end of the driving shaft 68 of the chute. A suitable manner of fashioning the outer end of shaft 67 for such a purpose is to provide a suitable slot 69 therein for receiving one end of the shaft 68.

It will be noted that the gear box 47 is cylindrical in form and that diametrically opposite the bearing arm 62 there is a curved arm 70 (Fig. 9) terminating in a vertical portion 70a extending parallel to the casing 63. This parallel portion 70 is provided with an adjustable bearing 71 which may be adjusted by a wing bolt 72. This bearing is adapted for receiving the other end of the shaft 68. Thus, the gear box 47 with its laterally extending arms 62—63 and 70—70a forms the head support for the chute or auxiliary conveyor 73.

The chute or secondary conveyor 73 consists of side walls 73a with a head roller 74 on the shaft 68 for supporting the endless conveyor belt or apron 75 as is usual in the art. The side walls of the chute 73 are cut away for about twenty inches at their upper forward portions adjacent the main conveyor and slide pieces 76 (Fig. 7) are inserted at the cut-out portions and maintained in position by guide keepers 77. It will be noted that the rear ends of the slide plates 76 overlap the side walls; they are adapted to be shifted or adjusted with respect to the main conveyor so as to provide proper cooperative relation for receiving the material from the main conveyor especially when the chute is at right angles to the main conveyor as shown in dotted lines in Fig. 6.

In some instances, it may be desirable to use a tandem chute, and in Fig. 3 a tandem chute is shown in which the second chute 78 may be suspended by means of yokes 79 from the rear end of the chute 73. The second secondary conveyor may be operated by sprocket gearing from the tail end of the chute 73 as is obvious.

When the conveyor is not in use, as when the truck is traveling, it may be desirable to fold the main conveyor against the rear of the truck, as shown in Fig. 11, and fasten the same by hooks 80 or the like. When it is desired to use this feature, it is necessary to use a longer drive sprocket 46 and use a spring tension roller 81 in connection therewith. This tension roller 81 will be mounted upon a pair of arms 82 which may be those of an integral yoke pivotally mounted upon the truck frame and controlled by a coil spring in a manner well known. Of course, before folding the main conveyor, the chute will be removed.

When the truck body has been tilted for an unloading operation, the attendant standing at the rear end of the truck can control the operation of the unloading mechanism through the manipulation of the lever 26 which controls the driving and reversing gears and through a cable 84 (Fig. 5) which may be mounted along side of the truck and extend to the engine control in the cab of the truck.

In use, it is possible to adjust the chute 73 from a position in alignment with an end of the conveyor to a position at right angles thereto while maintaining the driving relation as shown in dotted lines in Fig. 6. Moreover, the chute can be swung to discharge either to the right or to the left; that is, to either side. It is also possible to uncouple the gear box 47 from the conveyor frame, and disconnect the shaft 58 from the shaft 20a and position the chute 73 at the opposite end of the conveyor as indicated in dotted lines in Figs. 6 and 4. When this is done, the drive will, of course, be reversed through lever 29.

It will be noted that the shaft 58 is connected with the lower section 47b of the gear box 47 while the arms 62 and 70 that support the chute are on the upper section 47a. As a result, one section will turn relative to the other section during swinging movements of the chute as shown in Fig. 6.

The main conveyor trough which may be made of one piece is shown provided with slots 85 (Fig. 4) in the bottom for the removal of dust and dirt which may be received in a receptacle therebeneath.

After the truck has been tilted to unloading position, the attendant can stand at the rear of the truck and through the cable 84 be able to start the power mechanism for operating the main conveyor and the chute. At the same time, through the manipulation of the lever 26, the conveyor operating mechanism can be clutched to the driving shaft. The lever 29 is adapted to control the direction of the drive which may be direct or reverse.

From the foregoing, it will be evident that a novel combination of unloading conveyors has been provided for a truck involving a transverse conveyor and a chute which may be attached adjacent either end of the conveyor, or removed from one end and attached to the other, and put in proper operation through the driving clutch the reversing gears and the cable control in a convenient manner from a position at the rear of the truck.

I am aware that many changes may be made and various details varied without departing from the principles of this invention, so I do not propose limiting the patent granted otherwise than necessitated by the appended claims.

I claim:

1. In a material hauling truck having a longitudinally tiltable body, a horizontally disposed conveyor attached transversely of the rear of said body, means for driving said conveyor from the power plant of said truck including a gear box rigid on the bottom of the conveyor, a two-ended shaft extending through said gear box transversely of the truck, each end of said shaft being fashioned for coupling relation with a second shaft, a second gear box, means for removably mounting said second gear box on the bottom of the conveyor for swivel and slidable movements, a secondary conveyor supported by said second gear box, and driving means for said secondary conveyor carried by said second gear box and having a removable coupling relation with a selected end of said shaft extending through the first gear box.

2. In a material hauling truck having a longitudinally tiltable body, a transversely extending and horizontally disposed conveyor attached to the rear end of said body, a stationary gear box attached to the bottom of said conveyor, a shiftable gear box having a movable and swivel connection with the bottom of the conveyor in spaced relation to the stationary gear box and adjacent one end of the conveyor, said shiftable gear box having oppositely extending arms, a chute supported by said arms, a driving connection between said secondary conveyor and shiftable gear box, a flexible and removable driving connection between said gear boxes, and a driving connection between the power plant of said truck and said stationary gear box.

3. In a material hauling truck having a tiltable body, a transverse conveyor upon the rear of said body, means for driving said conveyor from the power plant of said truck including reversing gearing on said conveyor, a swivel gear housing mounted for bodily movement on the conveyor frame adjacent one end thereof, said gear housing having supports, a chute mounted upon said supports and driving means connecting said chute with said reversing gearing including a flexible shaft having a removable connection with said reversing gearing.

4. In a material hauling truck having a tiltable body a conveyor extending transversely upon the rear of said body, means for driving said conveyor from the power plant of said truck including a reversing gearing on said conveyor, a cylindrical gear housing movably supported upon said conveyor and comprising relatively rotational sections, a chute supported by one section and a driving connection from the other section to said reversing gearing and including a flexible shaft, the first section having a driving connection to said chute.

5. In a material hauling truck having a tiltable body, a conveyor extending transversely of the rear of said body, a chute removably attached to one end of said conveyor and means for supporting said chute for swinging movements for discharging from either side of said conveyor, said chute having side walls with adjustable portions adjacent said conveyor to provide an opening into said chute when the same is swung at right angles to the conveyor.

6. In a material hauling truck having a longitudinally tiltable body, a horizontally disposed conveyor extending transversely of the rear of said body and a chute having a selective movable and swivel relation to either end of said conveyor, said chute having side walls with opposite selectively openable portions adjacent that end proximate the conveyor for transfer of material when said chute is swung to discharge in a lateral direction to said conveyor.

JOSEPH W. DAVIS.

REFERENCES CITED

The following references are of record in the file of this patent:

UNITED STATES PATENTS

| Number | Name | Date |
| --- | --- | --- |
| 710,611 | Ray | Oct. 7, 1902 |
| 1,515,328 | Barkmann et al. | Nov. 11, 1924 |
| 1,553,597 | Clark | Sept. 15, 1925 |
| 2,102,432 | Nesseth | Dec. 14, 1937 |
| 2,293,486 | Barrett | Aug. 18, 1942 |
| 2,304,249 | Erickson | Dec. 8, 1942 |
| 2,321,168 | Tognetti | June 8, 1943 |